July 2, 1968

T. C. HUKLE 3,390,575

ADJUSTABLE TRANSDUCER MOUNT

Filed June 2, 1967

INVENTOR.
THOMAS C. HUKLE
BY
Christensen, Sanborn, & Matthews
ATTORNEYS

July 2, 1968  T. C. HUKLE  3,390,575
ADJUSTABLE TRANSDUCER MOUNT
Filed June 2, 1967  2 Sheets-Sheet 2
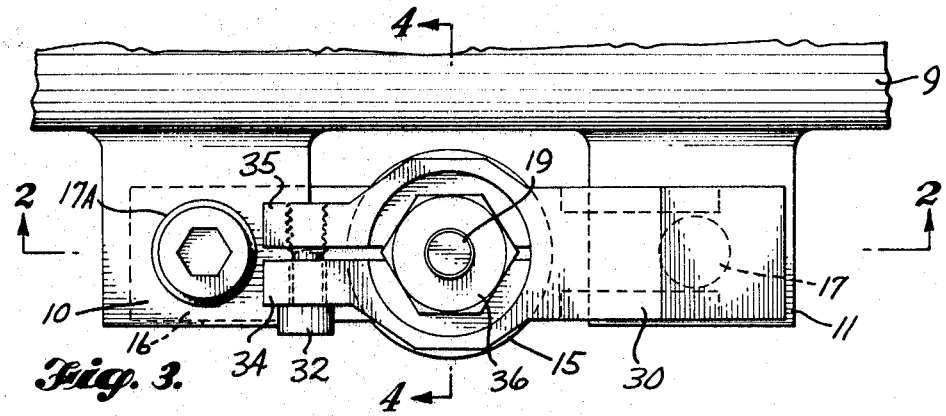
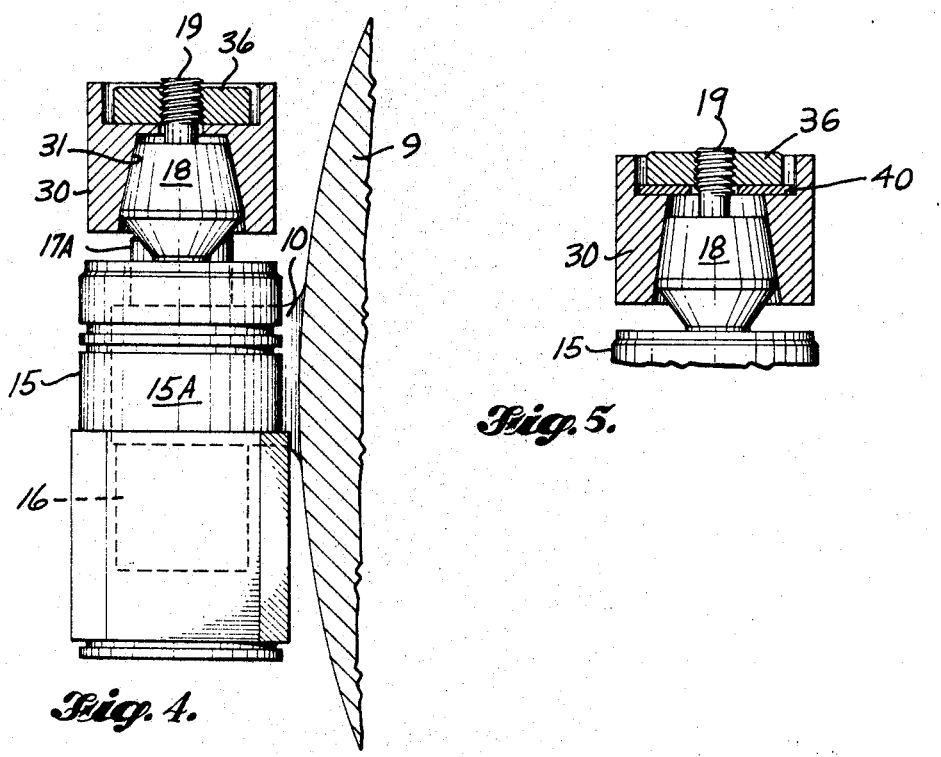
INVENTOR.
THOMAS C. HUKLE
BY Christensen, Sanborn, & Matthews
ATTORNEYS

United States Patent Office 3,390,575
Patented July 2, 1968

3,390,575
ADJUSTABLE TRANSDUCER MOUNT
Thomas C. Hukle, Seattle, Wash., assignor to Electro Development Corporation, Seattle, Wash., a corporation of Washington
Filed June 2, 1967, Ser. No. 643,234
4 Claims. (Cl. 73—141)

ABSTRACT OF THE DISCLOSURE

A mounting assembly for locating and accurately positioning a transducer assembly is disclosed. In the preferred embodiment a pair of lugs are provided on a load carrying beam, such as an axle, with the lugs being axially aligned for supporting the transducer assembly and associated mounts. The shear displacement occurring along a plane perpendicular to a longitudinal axis of the beam is measured. Novel transducer mounting arms are described for locating an in-line transducer between the lugs. A portion of the transducer is coupled with one of the mounting arms through the use of mating conical surfaces which are so interrelated that hysteresis effects are essentially eliminated and accurate positioning of the parts is made possible. Details of a conical male portion for the transducer adapted to be accurately positioned in a re-entrant conical female portion of the arm and having an opening of adjustable diameter are disclosed.

---

In many applications it is necessary to measure the shear forces acting on a member such as an axle or other beam. For example, in determining the load on the axles of an aircraft it is important to have the capability of determining the shear forces acting on the axle. In such applications the displacement between two adjacent cross sectional planes in a direction perpendicular to the longitudinal axis is the measurement of interest. While complicated flexure arrangements can be provided to permit the use of beam-type transducer assemblies for measuring the shear displacement between such adjacent planes, it would be advantageous to have a transducer mounting assembly which would permit the use of an in-line transducer (such as makes use of a conveitional strain gauge). It is therefore an object of the present invention to provide such a transducer mounting assembly.

It is another object of the present invention to provide a transducer mounting apparatus for interconnecting first and second parts in a manner which essentially eliminates hysteresis effects which tend to occur when separating forces are applied to the two parts. Another object of the invention is to provide an apparatus for attaching the sensitive portion of an in-line transducer to a stationary member with the apparatus permitting preloading of the transducer.

An additional object of the invention is to provide a transducer head and associated attachment arms for permitting the use of an in-line transducer to measure displacement between surfaces which are not properly oriented for direct in-line transducer measurements. A further object of the present invention is to provide apparatus for attaching an in-line transducer assembly to a pair of co-planar surfaces in a manner which permits use of said transducer to measure relative displacement between the surfaces along a direction perpendicular to the plane of the surfaces.

In accordance with the teachings of the present invention a conical head is provided for a transducer with a head being so shaped that a tapered cylindrical surface is provided. This surface is adapted for engagement with a corresponding tapered or conical opening in a mounting arm. The bottom of the opening in the mounting arm which receives the end of the transducer is provided with a smaller opening through which an extended portion of the transducer head passes. The extended portion is threaded so that when a nut is placed thereon and tightened, a force tending to pull the conical male member into the re-entrant conical opening will be provided. The apparatus is further provided with means for adjusting the diameter of the opening so that by alternately tightening the aforesaid nut and reducing the diameter of the opening a firm fit between the two parts is assured.

In one specific embodiment the transducer mounting arm is provided with a right-angled portion to permit attachment of the same to a first lug on an axle. When the head of an in-line transducer is secured to the arm, the sensitive axis of the transducer is maintained perpendicular to the longitudinal axis of the axle or beam on which the lug is provided. The main body of the transducer is secured by a second arm to a second lug which is axially aligned with the first lug, the arrangement being such that relative movement between the two lugs along a tangent of the axle can be detected and measured. By having a simple flexure on the head supporting portion of the transducer it is found that the system is adapted to provide output signals which are accurately related to the shear forces acting along a plane perpendicular to the longitudinal axis of the axle or beam.

The above as well as additional advantages and objects of the invention will be more clearly understood from the following description when read with reference to the accompanying drawings and wherein, FIGURE 1 is a perspective view of the novel transducer mounting assembly mounted on an axle.

FIGURE 3 is a top view of the apparatus of FIGURE 1.

FIGURE 4 is an elevation along the lines 4—4 on the top view of FIGURE 3. FIGURE 5 is an additional embodiment of the arm and transducer head coupling apparatus shown in cross section.

Figure 1:
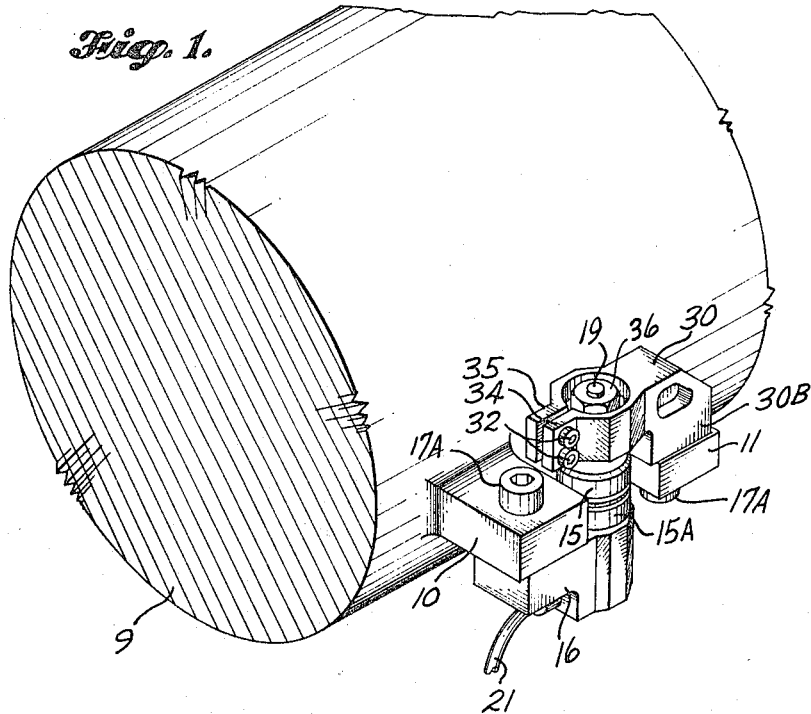
Figure 2:
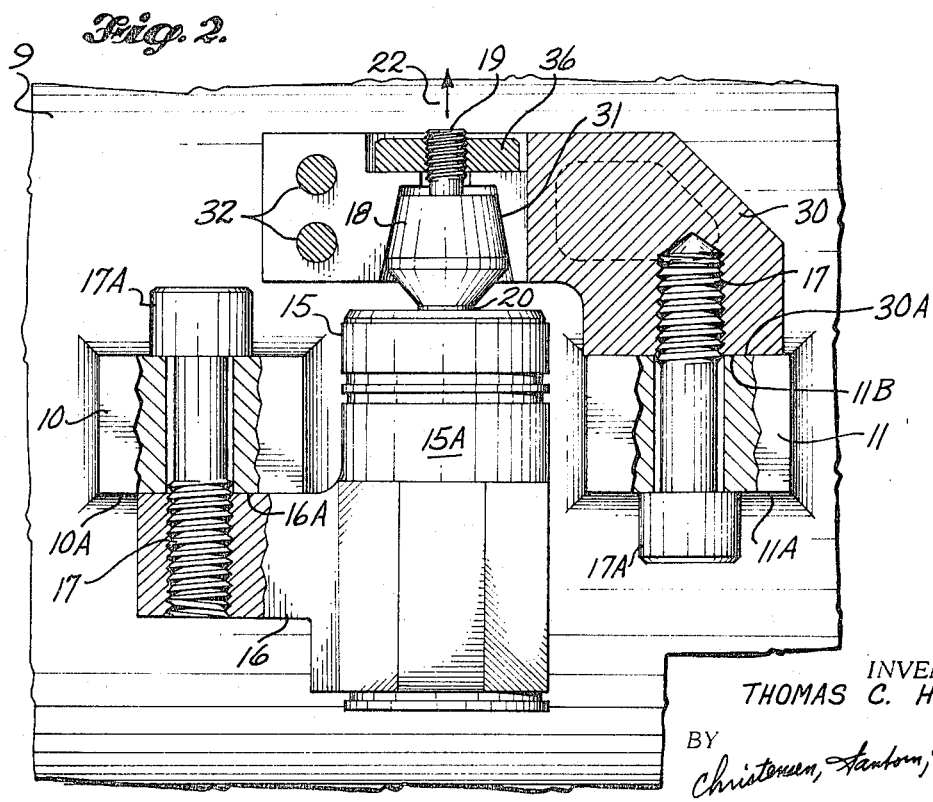
FIGURE 2 is a front elevation partially in section of the apparatus in FIGURE 1 and taken along the lines 2—2 of FIGURE 3.

Turning now to the drawings and in particular to FIGURES 1 and 2 the invention is shown for purpose of illustration as being adapted for measurement of the displacement between two adjacent cross sectional planes of an axle 9. A pair of heavy lugs 10 and 11 are forged on the axle 9 in a manner such that substantially flat surfaces 10A and 11A are provided with each of the two surfaces corresponding essentially to radii of the axle. Since the two surfaces 10A and 11A if extended would pass through the central longitudinal axis of the axle it will be seen that if the relative displacement of the two surfaces 10A and 11A along a line perpendicular to the surfaces is measured, the shear forces acting on the axle can be accurately determined.

An in-line transducer or load cell assembly 15 which includes a strain gauge is provided with an integral casing and arm 16 having a plane surface 16A which mates with the surface 10A. A threaded bolt 17 having an enlarged head 17A is seen to pass through an appropriate opening in the lug 10 and threads into the arm 16 so that the transducer 15 is firmly held in position on the lug 10.

The tranducer 15 is provided with a head 18 which is conical with the extreme end thereof tapering to provide tapered side surfaces which converge toward the extreme end of the head. The upper end of the head 18 is in the shape of a threaded stud 19. As is conventional with such transducers, an appropriate flexure 20 serves to couple the head 18 to the strain measuring assembly contained within the housing of the transducer. The transducer 15 serves to provide output electrical signals on the output lead 21 with the signal being proportional to relative movement between the head 18 and the main body 15A along the direction indicated by arrow 22.

The apparatus includes a transducer mounting arm 30 having a flat surface 30A which mates with the upper flat surface 11B on the lug 11. Surfaces 11A and 11B are substantially parallel and thus the vertical section 30B of the transducer mounting arm 30 is perpendicular to the surface 10A. The arm 30 has a 90° angle formed therein so that its re-entrant conical opening 31 is adapted to mate with the head 18. As seen most clearly in FIGURES 1 and 3 the arm 30 is slotted from the left end into the opening 31 in a manner such that the diameter of the opening 31 can be adjusted by means of tightening or loosening the bolts 32 which extend through the section 34 and are threaded into the section 35 of the arm 30. A suitable opening is provided in the arm at the base of opening 31 to permit passage of the threaded stud 19 therethrough. The arrangement is such that the nut 36 when tightened serves to pull the head 18 more deeply into the opening 31.

The arrangement shown permits accurate positioning of the head 18 within the arm 30. In practice it is advantageous to alternately tighten the nut 36 and the bolt 32 so that the cone 18 is firmly seated within the transducer mounting arm 30. This method of adjustment supports the transducer attachment point in two perpendicular planes and thus eliminates hysteresis effects in the adjustment. It also allows for minute pre-load adjustments. For example, tightening the nut 36 before the bolts 32 is completely tightened permits a tensile pre-load to be induced in the transducer. By tightening the bolts 32 before the nut 36 is completely tightened a compressive pre-load is provided. It is of particular importance to note that the mounting and adjustment arrangement serves to absorb tolerance in the distance between the mounting surfaces provided by the lugs 10 and 11 by allowing the arms 16 and 30 to rotate slightly as required. Since the transducer is provided with an appropriate flexure it will be seen that lateral forces which might otherwise tend to introduce error signals are eliminated and hence the output signals on the lead 21 are proportional to the shear displacement along a line perpendicular to the surfaces 10A and 11A.

In the alternative embodiment of the transducer coupling arm 30 shown in FIGURE 5 the opening 31 extends with a uniform taper completely through the arm. A flat plate in the form of a washer 40 is positioned beneath nut 36 and around stud 19. While various arrangements can be used to provide the mating tapered walls of the transducer head and the connecting arm, the arrangement of FIGURE 5 facilitates fabrication.

There has been disclosed an improved transducer mounting apparatus which makes possible an extended usage of in-line transducers. Since such transducers or load cells are conveniently flexured to be immune to lateral displacements, the output signals from the device when mounted in the manner disclosed herein provides accurate information regarding shear displacements of the lugs. While the invention has been disclosed for purpose of illustration by reference to a presently preferred embodiment, it will be obvious to those skilled in the art that modifications such as the use of multi-step cones and other arrangements can be used without departing from the generic inventive concepts. It is intended that such modifications will be encompassed by the following claims.

What is claimed is:

1. Apparatus for measuring the shear forces on a beam comprising in combination: first and second lugs extending radially outwardly from said beam and axially displaced from each other on opposite sides of the shear plane to be monitored; an in-line load cell having a conical head member extending therefrom in a first direction which is parallel to the sensitive axis of the cell; attachment means connecting said load cell to said first lug with the sensitive axis of said cell maintained substantially parallel to said shear plane; a connecting arm secured to said second lug and having a conical opening of adjustable diameter aligned with said head and including adjustment means for reducing the diameter of said opening after said head has been located therein; and threaded stud means interconnecting said head and said arm and forcing said head into said opening, whereby said stud means and said adjustment means can be alternately tightened to provide firm engagement of said head with said arm.

2. Apparatus as defined in claim 1 wherein said arm has an elongated radial slot communicating with said opening and said adjustment means includes bolt means extending through said slot for closing the same to thereby tighten the arm about the head.

3. Apparatus as defined in claim 1 wherein said lugs are substantially disposed in a second plane perpendicular to said shear plane, said arm has a first section extending perpendicular from said second plane and a second section substantially parallel to said second plane, and said opening is provided in said second section.

4. Apparatus as defined in claim 3 wherein said load cell includes a case and said attachment means includes a second arm secured to said case and extending parallel to said second plane.

References Cited

UNITED STATES PATENTS 1,607,273    11/1926    Hecht _____ 85—1 XR
2,865,200    12/1958    Gieseler _____ 73—147

RICHARD C. QUEISSER, *Primary Examiner.*

JAMES GILL, *Examiner.*

J. R. FLANAGAN, *Assistant Examiner.*